(12) United States Patent
Ferenc et al.

(10) Patent No.: US 10,882,233 B2
(45) Date of Patent: Jan. 5, 2021

(54) VALVE STEM ACTUATION

(71) Applicant: HUSKY INJECTION MOLDING SYSTEMS LTD., Bolton (CA)

(72) Inventors: Stephen Daniel Ferenc, Bolton (CA); William Steven Keir, Aurora (CA); Brandon Douglas White, Fairfax, VT (US)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 31 days.

(21) Appl. No.: 15/773,824

(22) PCT Filed: Nov. 14, 2016

(86) PCT No.: PCT/CA2016/051317
§ 371 (c)(1),
(2) Date: May 4, 2018

(87) PCT Pub. No.: WO2017/088044
PCT Pub. Date: Jun. 1, 2017

(65) Prior Publication Data
US 2018/0326635 A1 Nov. 15, 2018

Related U.S. Application Data

(60) Provisional application No. 62/258,704, filed on Nov. 23, 2015, provisional application No. 62/290,252, filed on Feb. 2, 2016.

(51) Int. Cl.
*B29C 45/28* (2006.01)
*B29C 45/84* (2006.01)

(52) U.S. Cl.
CPC ............ *B29C 45/281* (2013.01); *B29C 45/84* (2013.01); *B29C 2045/2813* (2013.01); *B29C 2945/76752* (2013.01)

(58) Field of Classification Search
CPC ..................... B29C 45/281; B29C 2045/2813
See application file for complete search history.

(56) References Cited

U.S. PATENT DOCUMENTS 3,892,512 A 7/1975 Diehl
4,443,178 A 4/1984 Fujita
(Continued)

FOREIGN PATENT DOCUMENTS

CN 201863357 U 6/2011
CN 202367911 U 8/2012
(Continued)

OTHER PUBLICATIONS

Woodford, Chris. "Gas Springs". (Jul. 15, 2015) https://web.archive.org/web/20151031085012/https://www.explainthatstuff.com/gassprings.html (Year: 2015).*

(Continued)

*Primary Examiner* — Timothy Kennedy
*Assistant Examiner* — Alexander A Wang

(57) ABSTRACT

An apparatus and method for actuating a valve stem between an open position and a closed position and for taking one or more valve gated nozzle out of service is disclosed. The hot runner includes a valve gated nozzle having a valve stem, the valve stem coupled to a piston that is held against an actuation plate via pressurized air. When a valve stem becomes stuck in a gate of the hot runner, the actuation plate can continue to move while the piston remains stationary. The valve stem may also be protected from an over force situation such as if the valve stem encounters an obstruction as the actuation plate is moving toward the closed position.

11 Claims, 9 Drawing Sheets

(56) References Cited

U.S. PATENT DOCUMENTS

| | | |
|---|---|---|
| 5,078,589 A | 1/1992 | Osuna-Diaz |
| 5,375,994 A | 12/1994 | Friderich et al. |
| 5,660,369 A | 8/1997 | Gauler |
| 6,062,840 A | 5/2000 | Lee et al. |
| 6,113,381 A | 9/2000 | Gellert et al. |
| 6,343,921 B1 | 2/2002 | Kazmer et al. |
| 6,755,641 B1 | 6/2004 | Nakanishi |
| 7,014,455 B2 | 3/2006 | Olaru |
| 7,022,278 B2 | 4/2006 | Colonico |
| 7,086,852 B2 | 8/2006 | Nakanishi |
| 7,125,246 B2 | 10/2006 | Schmidt |
| 7,210,922 B1* | 5/2007 | Kohler ............... B29C 45/1775 425/563 |
| 7,341,688 B2 | 3/2008 | Niewels |
| 7,553,150 B2 | 6/2009 | Kaushal et al. |
| 7,713,046 B2 | 5/2010 | Fairy |
| 7,722,351 B2 | 5/2010 | Feick et al. |
| 7,766,646 B2 | 8/2010 | Feick et al. |
| 7,815,431 B2 | 10/2010 | Gunther |
| 7,866,975 B2 | 1/2011 | Gunther |
| 7,931,455 B2 | 4/2011 | Tabassi |
| 7,963,762 B2 | 6/2011 | Tabassi et al. |
| 7,988,445 B2 | 8/2011 | Tabassi et al. |
| 8,100,689 B2 | 1/2012 | Bouti et al. |
| 8,142,182 B2 | 3/2012 | Feick et al. |
| 8,220,362 B2 | 7/2012 | Uracz et al. |
| 8,282,870 B2 | 10/2012 | Bouti et al. |
| 8,308,476 B2 | 11/2012 | Tabassi et al. |
| 8,393,889 B2 | 3/2013 | Hontheim et al. |
| 8,465,688 B2 | 6/2013 | Feick et al. |
| 8,920,155 B2 | 12/2014 | Geibel, Jr. |
| 8,985,997 B2 | 3/2015 | Klobucar et al. |
| 2005/0046083 A1 | 3/2005 | Dewar et al. |
| 2009/0220636 A1 | 9/2009 | Gunther |
| 2010/0124579 A1* | 5/2010 | Tabassi ............... B29C 45/281 425/3 |
| 2011/0304075 A1 | 12/2011 | Catoen et al. |
| 2014/0327173 A1 | 11/2014 | Jenko et al. |
| 2015/0014887 A1 | 1/2015 | Keitel et al. |
| 2015/0151473 A1 | 6/2015 | Olaru |
| 2015/0158227 A1 | 6/2015 | Schreyer et al. |

FOREIGN PATENT DOCUMENTS

| | | |
|---|---|---|
| DE | 19611880 A1 | 10/1997 |
| DE | 19943797 A1 | 3/2001 |
| DE | 102011106606 A1 | 12/2012 |
| EP | 0021273 B1 | 4/1991 |
| EP | 1426160 A1 | 6/2004 |
| FR | 2537497 A1 | 6/1984 |
| FR | 2829058 B1 | 5/2005 |
| JP | 2002513687 A | 5/2002 |
| JP | 2009160844 A | 7/2009 |
| KR | 100655750 B1 | 12/2006 |
| WO | 1992013700 A1 | 8/1992 |
| WO | 2012173955 A1 | 12/2012 |
| WO | 2013074741 A1 | 5/2013 |

OTHER PUBLICATIONS

PCT International Search Report; Zhang, Pengfei; Jan. 16, 2017; 5 pages.

European Search Report, Raicher, Gerald, dated Jun. 5, 2019, 5 pages.

* cited by examiner

VALVE STEM ACTUATION

TECHNICAL FIELD

The disclosed embodiments are generally directed to injection molding machines and more particularly to valve stem actuation.

BACKGROUND

Injection molding machines are used to produce plastic molded parts such as, for example, preforms of the type that are blow moldable into beverage containers. Typically, hot runners include a manifold that delivers hot melt from a sprue bushing to one or more nozzles, which, in turn, deliver the melt to individual cavities of the mold. In some hot runners, the flow of molding material through the nozzles is controlled by valve stems that are actuated back and forth to open and close gates at the ends of the nozzles. The valve stems may be individually actuated by hydraulic, pneumatic or electric actuation arrangements or may be simultaneously actuated via one or more actuation plate(s). Such systems used to simultaneously actuate the valve stems do not provide a satisfactory solution in all aspects.

SUMMARY

According to one aspect, a hot runner of an injection molding machine for distributing melt into a mold cavity is provided. The hot runner includes a first valve gated nozzle having a first valve stem, a first piston coupled to the first valve stem, and an actuation plate acting on the first piston and configured to move the first valve stem between an open position and a closed position. The first piston is held (biased) against at least a portion of the actuation plate via pressurized air to move with movement of the actuation plate.

According to another aspect, a hot runner of an injection molding machine for passing melt into a mold cavity is provided. The hot runner includes a first valve gated nozzle having a first valve stem, and a first piston coupled to the first valve stem. The first piston has a passageway arranged to transfer pressurized air to a chamber. The pressurized air biases the valve stem into a closed position. An actuation plate acts on the first piston and is configured to move the first valve stem between an open position and a closed position. When the first valve stem encounters an obstruction while being moved towards a closed position, the pressurized air acting on the first piston becomes compressed in the chamber.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF INVENTION

Figure 1C:
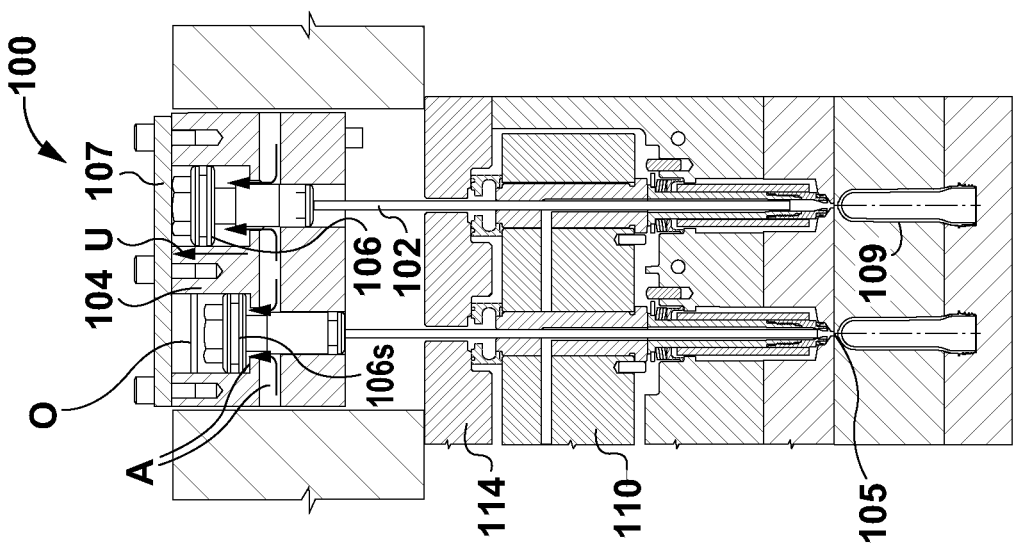
FIG. 1C is the valve stem actuation system of FIG. 1C, with one of the valve stems in a stuck position.

Injection molding machines are used to produce plastic molded parts. Typically, such machines include a manifold that passes melted molding material, also referred to as melt, to nozzles that, in turn, pass the melt to individual mold cavities. In some hot runners, the nozzles include valve stems that reciprocate back and forth to open and close gates at the end of the nozzles.

While valve stems may be individually actuated, in some systems, it may be advantageous to simultaneously actuate all of the valve stems at the same time. In such systems, the valve stems may be attached to an actuation plate that reciprocates back and forth to move the valve stems. With simultaneous actuation, if even a single valve stem fails (e.g., becomes stuck in a closed position), the injection molding machine must be shut off to correct the problem. In contrast, with individual actuation, if a single valve stem fails, the single valve stem may be deactivated while the other valve stems may continue to be actuated.

Some known simultaneous actuation systems have been designed to allow the injection molding machine to continue to operate even if one of the valve stems becomes stuck. For example, the valve stems may be arranged to break or shear such that when a valve stem is stuck in the closed position, movement of the plate towards the open position causes the stuck valve stem to break. Such an arrangement is shown and described in U.S. Pat. No. 8,282,870, the contents of which are hereby incorporated by reference in its entirety. In another example, valve stems may be mechanically coupled to the plate via springs that are configured to push the valve stems into the open position (e.g., when an injection cycle has finished) and to compress if a valve stem become stuck in the closed position and the plate is moving towards the opened position. Such an arrangement is shown and described in U.S. Pat. No. 7,210,922, the contents of which are hereby incorporated by reference in its entirety. In still another example, the valve stems may be magnetically coupled to the actuation plate and may be configured to decouple from the plate if the valve stems become stuck. Such known systems, however, do not provide a satisfactory solution in all respects.

Applicant has realized that by using pressurized air acting as an air spring to maintain contact between the valve stems and a portion of the actuation plate during plate actuation, various advantages may be realized. For example, in some embodiments, the hot runner may continue to operate when one or more of the valve stems become stuck in the closed position. In some embodiments, using pressurized air to maintain contact between the valve stem and the portion of the actuation plate also may allow the valve stem to be protected when the valve stem reciprocates between the open and closed positions and becomes stuck in the closed position and/or encounters an obstruction (e.g., in the mold the cavity). To that end, embodiments disclosed herein include a hot runner that uses pressurized air to hold the valve stems against the portion of the actuation plate, such as a retainer plate located at the back of the actuation plate, during plate actuation. Another technical effect of the air spring connection may include simplified hot runner startup. At startup, prior to start of a molding process, a calibration of the plate actuator must be completed. Calibration is done by cycling the actuation plate several times thereby repositioning the valve stems between closed and open positions. By virtue of the air spring connection the calibration can be done with the hot runner in either a cold or heated state. Specifically, the air supply to the air spring can be disabled to allow the operator to calibrate in either cold condition or hot condition for added convenience. In the hot condition with the air disabled, the valve stems will remain in closed position as the actuation plate is calibrated. Advantages of the foregoing may include reduced risk of drool flowing into the cavities because the valve stems remain closed thereby alleviating the additional requirement for the operator to remove solidified drool from cavities prior to startup of process and thereby save time.

For purpose herein, holding the valve stem against the portion of the actuation plate may mean that the valve stem (or an extension thereof) is pressed against the portion of the actuation plate or otherwise biased to a predetermined position relative thereto during plate actuation. As will be appreciated, if the source of pressurized air is turned off, the valve stems will no longer be pressed against the portion of the actuation plate. In some embodiments, the valve stems may directly contact the actuation plate. In other embodiments, the valve stems may indirectly contact the actuation plate (e.g., via pistons). The valve stem may be pressed in an upward direction relative to the actuation plate (i.e., towards the open position). In some embodiments, holding the valve stem against the portion of the actuation plate may mean that the position of the valve stem is maintained relative to the position of the actuation plate during plate actuation.

According to one aspect, the hot runner includes air pistons that hold the valve stems against the portion of the actuation plate (e.g., against the retainer plate). That is, each valve stem may be coupled to an air piston, wherein the pressurized air A holds the piston against the portion of the actuation plate. As will be appreciated, the valve stem may be coupled to the piston via any suitable method (e.g., a screw, magnet, slot connection, etc.). As will be further appreciated, the piston will not be held against the portion of the actuation plate if the pressurized air is turned off. An example of a hot runner in an opened position, with valve stems held against a portion of the actuation plate (e.g., the retainer plate) via pressurized air applied to the corresponding air pistons, is illustrated in FIG. 1A, which will be discussed in more detail below. In this way, the pressurized air acts as an air spring.

In some embodiments, the pressurized air creates a force that is applied to the air pistons. In some embodiments, a threshold air pressure is applied to the air pistons. For purposes herein, a threshold air pressure may include an air pressure sufficient to produce a threshold force capable of holding the air pistons against the actuation plate (e.g., the retainer plate) during normal (e.g., an uninterrupted) operation of the hot runner. That is, the threshold force maintains contact between the piston and the portion of the actuation plate while the valve stem reciprocates between the open and closed positions. In some embodiments, the threshold air pressure is between about 100 and 150 psi, although other suitable pressures may be used. In some embodiments, the threshold air pressure is applied to the underside (e.g., a downstream side) of the air piston via air pressure channels in an air supply circuit formed in the actuation plate. That is, the pressure may be applied to the clamp side of the air pistons. In some embodiments, a seal is used to maintain the air pressure on the underside of the piston.

Figure 1B:
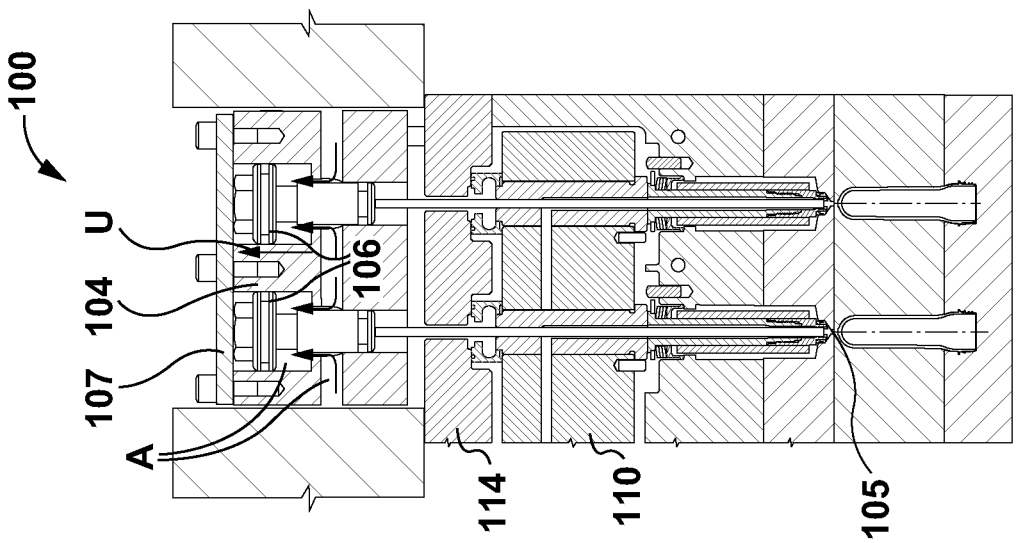
FIG. 1B is the valve stem actuation system of FIG. 1A, with the valve stems in a closed position.
Figure 1A:
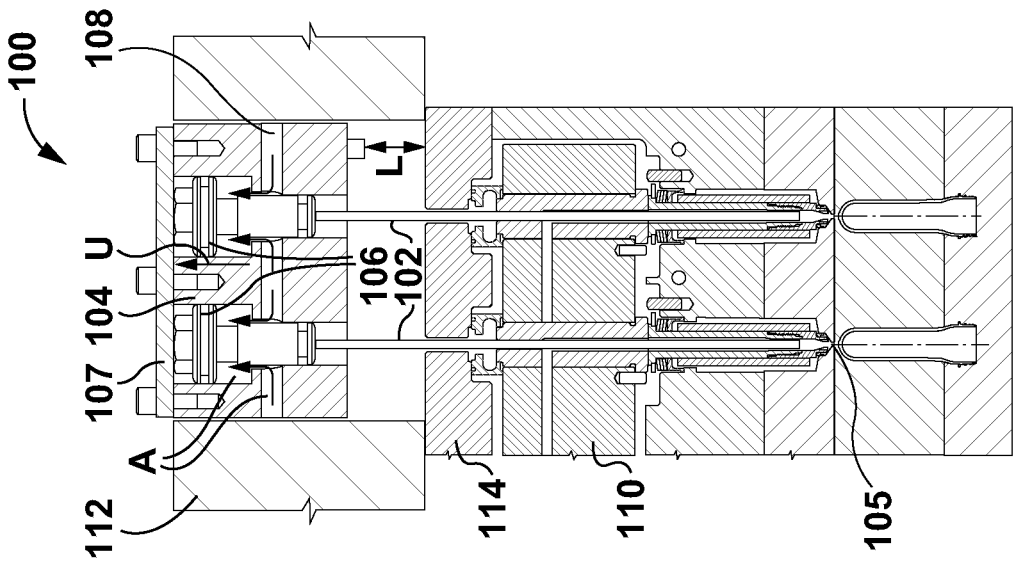
FIG. 1A is a cross-sectional schematic representation of a portion of a valve stem actuation system according to one embodiment, with valve stems in an open position.

As shown in FIG. 1B, the actuation plate moves towards the closed position (e.g., towards the gate) to cause the valves stems to block the flow of melt into a mold cavity. In such embodiments, the actuation plate and associated retainer plate pushes the air pistons, which moves the air pistons and valve stems, to the gates. As will be appreciated, the threshold force holds the air pistons against the retainer plate as the actuation plate is moved towards the closed position. In some embodiments, a distance that the valve stems travels between the open and closed positions, also referred to as a stroke length L, see FIG. 1A, is about 15 mm.

When the injection cycle has finished, the actuation plate returns to the open position. In embodiments in which there is no cavity failure (e.g., in an uninterrupted injection cycle), the valve stems can move freely between the closed and open positions via actuation by the actuation plate. In such a situation, the threshold force holds the pistons against the actuation plate and allows the actuation plate to pull the valve stems out of the gates. That is, the threshold force is greater than any holding force(s) exerted on the valve stems at the gate (e.g., a force generated by cooled melt in the mold or by another obstruction tending to prevent the valve stem from moving out of the gate).

Sometimes, however, one or more of the valve stems becomes stuck in the closed position (e.g., stuck at the gate), as illustrated in FIG. 1C. In such a situation, the threshold force applied to the air piston (i.e., the pressurized air applied to the underside of the air piston) is no longer sufficient to hold the piston against the actuation plate/ retainer plate and pull the valve stem out of the gate. That is, the threshold force is less than the holding force exerted on the valve stem at the gate.

When the valve stem becomes stuck at the gate, the corresponding stuck piston becomes separated from the portion of the actuation plate (e.g., from the retainer plate) as the actuation plate moves towards the opened position. For purposes herein, separation from the portion of the actuation plate may mean that pressurized air A no longer presses the piston against the portion of the actuation plate (e.g., the retainer plate). That is, the stuck piston no longer moves with movement of the actuation plate (e.g., the stuck piston does not reciprocate between the open and closed position). Instead, the actuation plate moves relative to the corresponding stuck valve stem and associated piston. As will be described in more detail below, although the stuck piston may become separated from the portion of the actuation plate, the stuck piston may still remain within the actuation plate (e.g., within a piston bore in the actuation plate).

Although one or more valve stems may be stuck at the gate (e.g., when one or more of the mold cavities is down), the hot runner may still continue to move the unstuck pistons and valve stems between the open and closed positions. In such a situation, the threshold force applied to the unstuck valve stems by the pressurized air is still sufficient to hold the unstuck valve stems to the portion of the actuation plate during plate actuation. As will be appreciated, the stuck valve stems and associated air pistons are maintained in the stationary position relative to the reciprocating actuation plate. For example, the actuation plate may include piston bores that receive the air pistons. As the actuation plate reciprocates, the air piston remains stationary, being held by the stuck valve stem, within the piston bore. As will be appreciated, in embodiments in which the stuck piston is separated from and remains stationary relative to the actuation plate, the pressurized air beneath the air piston is simply compressed.

As will be further appreciated, when one or more cavities are down (i.e., when one or more valve stems are stuck in the closed position), the system also may be stopped to allow for repairs. In such a situation, once the machine and pressurized air supply are turned off, the pistons may be separated from the actuation plate and may be removed for repair.

Turning now to the figures, FIGS. 1A-1C illustrate an example of a hot runner 100 according to one aspect. As shown in FIG. 1A, when the actuation plate 104 in an open position at the start of an injection cycle, both valve stems 102 are pressed against the portion of the actuation plate via pressurized air A. In such an embodiment, the valve stems 102 are coupled to pistons 106, and pressurized air A holds (biases) the pistons upwardly (see the arrow labeled U) against a retainer plate 107 at the back of the actuation plate 104. The pressurized air A travels through air channels 108 in an air supply circuit formed in the actuation plate 104. The hot runner 100 also includes, amongst other things, a manifold 110 for passing melt from a sprue bushing (not shown) to the nozzles (not shown), a manifold-backing plate 112, and a backing plate 114.

FIG. 1B shows the actuation plate 104 in the closed position, after the actuation plate 104 has traveled a stroke length L (see FIG. 1A) and the valve stems close the gate 105 (nozzle not shown). As with FIG. 1A, both valve stems are still pressed against the retainer plate 107 via pressurized air A acting on the pistons.

FIG. 1C illustrates the actuation plate 104 again in the open position, however, in this embodiment, one of the valve stems 102s is stuck at the gate 105. In such an embodiment, the holding force applied to the valve stem at the gate is greater than the threshold force pressing the valve stem 102s/piston 106s upwardly against the retainer plate 107. As shown in this figure, the corresponding stuck air piston 106s is connected to the stuck valve stem 102s and is no longer pressed against the retainer plate 107 (see e.g., the space O between the piston 106s and the retainer plate 107) and does not move with the movement of the actuation plate 104. In contrast, the unstuck valve stem 102 is still pressed against the retainer plate 107 via its corresponding piston 106 and has travelled with the actuation plate 104 to the open position.

Figure 2:
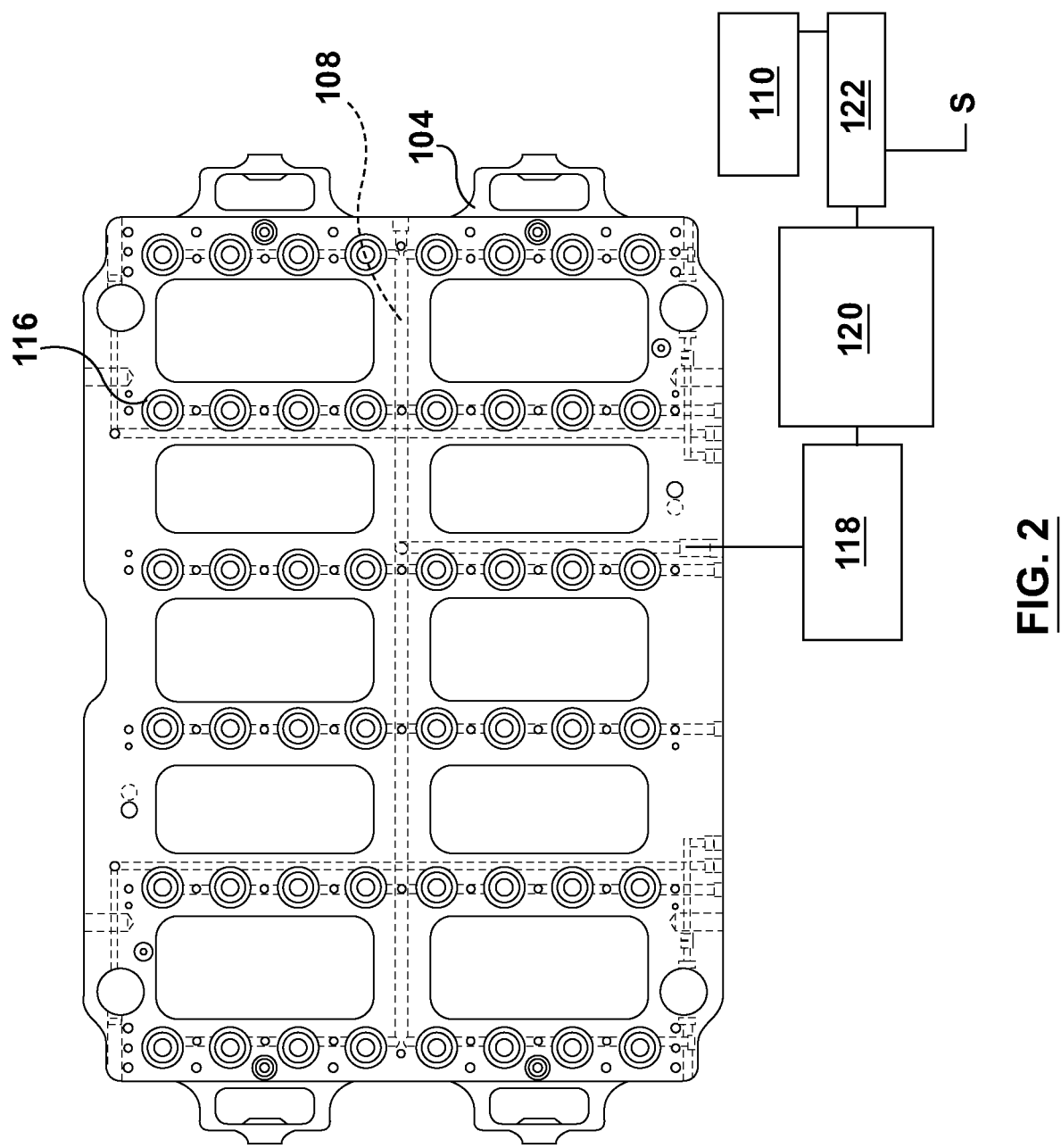
FIG. 2 is a bottom view of an actuation plate according to one embodiment.

Although two valve stems 102 are pressed against the actuation plate 104 in FIGS. 1A-1C (e.g., via two corresponding air pistons pressed against the retainer plate), it will be appreciated that the hot runner may include one or more valve stems 102. For example, as shown in FIG. 2, a bottom (underside) view of the actuation plate, the actuation plate 104 may be arranged to receive 48 valve stems and corresponding pistons. That is, the actuation plate 104 may have one or more drops 116 (e.g., 48 drops in FIG. 2), where the air pistons may be held against the actuation plate 104 (see FIG. 1). Other systems may include more or less drops, such as 24, 72, 96 or more. Also, although aspects described herein are discussed with respect to moving the valve stem upward to open the gate, the actuation system is not so limited and the valve stem can move upward to the close the gate. Those skilled in the art will readily appreciate that the pressurized air may then be supplied to a top side of the piston.

Figure 3:
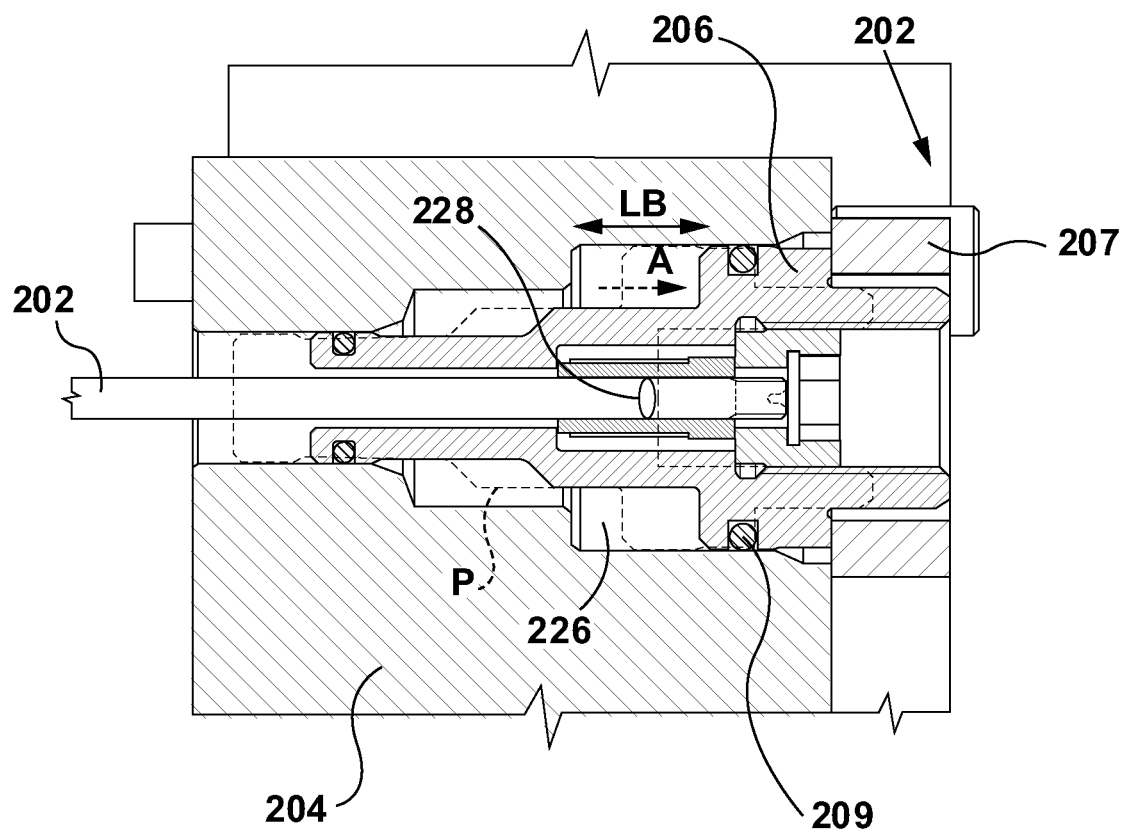
FIG. 3 is a cross-sectional schematic representation of a portion of a valve stem actuation system according to one embodiment.

As shown in FIG. 3, the piston 206 may be held in contact with a retainer plate 207. In some embodiments, a seal 209 is used to maintain the air pressure A in the cylinder/bore on the underside of the piston, as will be appreciated by those skilled in the art. As will be described, the cylinder may be an air piston bore 226 formed in the actuation plate 204. In embodiments in which the hot runner 200 operates normally, the seal(s) 209 remains static, like an O-Ring seal, for example. In such embodiments, as the actuation plate moves, so do the air pistons 206, which are pressed against the actuation plate via pressurized air. When the valve stem is in the stuck position and the actuation plate moves relative to the stuck valve stem/piston, the seal 209 acts as a sliding dynamic seal.

Turning back to FIG. 2, the air supply circuit supplies pressurized air A to each piston 104 via air channels 108 in the actuation plate 104. In one embodiment, all air channels are in fluid communication with each other and with a source of air pressure. As shown in this figure, the actuation plate 104 and air channels 108 are operatively connected to one or more pressure sensors 118 that detect a pressure in the circuit and/or at each of the drops. The pressure sensor(s) may provide feedback to a regulator 120, which may regulate a supply S of pressurized air into the circuit via a valve 122. The system will stop the molding process if the pressure sensor detects as loss of pressure during the molding process, that is below a specified set point. The sensor protects the hotrunner from over pressurization. With a loss of air pressure, the pistons (and valve stems) could lag behind the motion of the actuation plate, and injection could occur with valve stems in closed or partially open position. The pressure sensor prevents system from injecting at start up, if air supply connection is not completed between machine and hotrunner. In some embodiments, the valve 122 is adjusted such that a threshold pressure may be maintained at each drop. In some embodiments, the actuation plate 100 is also operatively connected to a user interface 124, which includes software and controls (not shown) that enable the operator to activate cavity down and cavity down maintenance functions. For purposes herein, cavity down may mean that the valve stem is stuck at the gate such that the cavity 109 may not be used for further injection molding.

In some embodiments, the air channels 108 are formed by gun drilling bores or holes through the actuation plate along the desired paths and plugging the ends of the bores or holes with a plug. As will be appreciated, the actuation plate also may be manufactured according to other processes to create the necessary channels. For example, the actuation plate may be formed by a split-and-bonded two-piece actuation plate (e.g., welding, brazing or diffusion bonding a two-piece actuation plate). The actuation plate also may be formed using solid free form fabrication, also known as additive manufacturing fabrication.

In some embodiments, the hot runner may be configured to operate when a cavity 109 (FIG. 1C) is down (e.g., when the valve stem is stuck in the gate leading to the cavity). As will be described in more detail below, this may be accomplished by maintaining the position of the stuck piston when the corresponding valve stem is stuck at the gate as the plate moves. For example, the piston may remain within the actuation plate in the stuck position. In such embodiments, the actuation plate may continue to reciprocate without being held back by the stuck valve stem(s) and/or by the corresponding stuck piston(s).

As shown in FIG. 3, for example, the actuating plate may include a piston bore 226 that receives the air piston 206. As will be appreciated to those of skill in the art, the size and shape of the piston bore 226 corresponds to the size and shape of the air piston 206. For example, a diameter of the piston bore may correspond to an outer diameter of the air piston 206 and be sized to accommodate the seal. In one embodiment, the piston and piston bore may both be cylindrically shaped, although other suitable shapes may be used.

In embodiments in which the hot runner operates normally, the air piston 206 is disposed within the piston bore 226 and is pressed against the retainer plate 207 via pressurized air A. In such embodiments, the seal 209 maintains the air pressure in the piston bore 226 on the underside of the piston. As will be appreciated, as long as the pressurized air A is on and generates the threshold force that exceeds the holding force, the air piston 206 may travel back and forth with the reciprocating movement of the actuating plate 204. As will be further appreciated, if the pressurized air A is turned off, the piston will no longer remain against the retainer plate 207 and the valve stem 202 will not reciprocate with movement of the actuation plate.

In embodiments in which the holding force is greater than the threshold force and the valve stem 202 becomes stuck at the gate (not shown), the corresponding stuck piston effectively separates from the actuation plate, allowing the actuation plate to move and further compressing the air beneath the piston. The position of the stuck air piston is illustrated by the dashed line labeled P. As shown in this figure, the stuck piston is no longer pressed against the retainer plate 207, however, the stuck piston still remain within the piston bore 226. In other words, the piston bore 226 is sized to accommodate the stuck and unstuck position of the air pistons 206. In one embodiment, the length of the bore LB is greater than a stroke length L to accommodate the stuck position P of the air piston 206.

In embodiments in which the hot runner continues to operate with a cavity down (e.g., reciprocates the actuation plate back and forth to move the unstuck valve stems between the open and closed positions), the reciprocating actuation plate moves relative to the stuck air piston. That is, the piston bore 226 moves freely around the stuck air piston 206 when the actuation plate reciprocates back and forth. As a result, the hot runner may continue to operate without having to physically disconnect the piston from the actuation plate.

According to another aspect, the hot runner may be configured to protect the valve stems by limiting the force that is applied to the valve stems. For example, the valve stem may be protected when the valve stem encounters an obstruction (e.g., a foreign body in the drop), that would otherwise overpower the force acting on the piston. Examples of hot runners 100 with a valve stem protection mechanism can be found in FIGS. 4 and 5A-5C.

Figure 4:
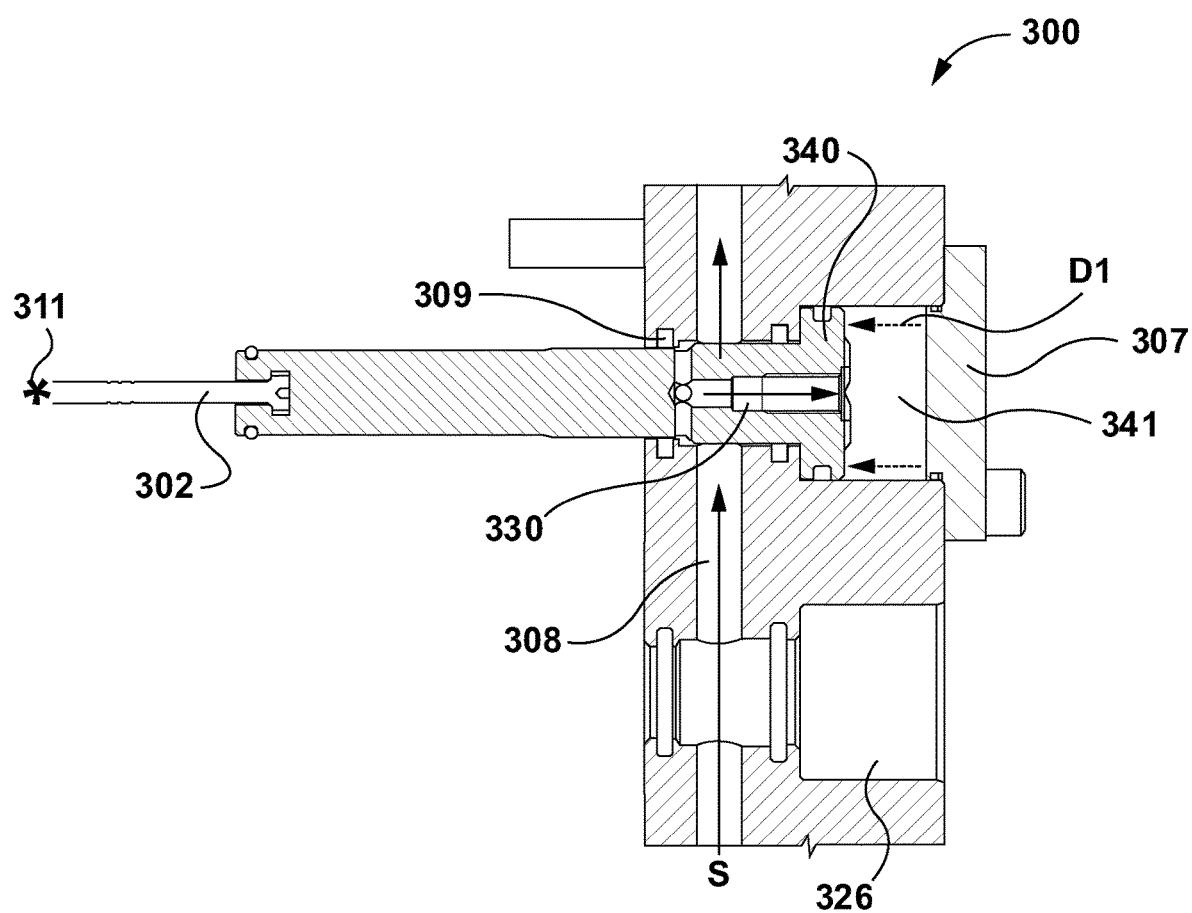
FIG. 4 is a cross-sectional schematic representation of a portion of a valve stem actuation system according to another embodiment.

For example, as illustrated in FIG. 4, the hot runner 300 may include a piston 340 with an air passageway 330 through which a supply of pressurized air S may pass into a chamber 341, between the piston and the retainer plate 307 (e.g., the pressurized air is passed from the air channel 308). In some embodiments, the chamber may be the air piston bore.

In some embodiments, the pressurized air (see the arrow labeled D1 biases the valve stems towards the closed position (e.g., towards the gate). That is, with reference to FIG. 4, air pressure D1 may be used to push the piston/valve stem toward the closed position. In such an arrangement, if the valve stem is obstructed when moving toward the closed position, the air acting on the piston becomes compressed, thus allowing the valve stem/piston to remain stationary as the actuation plate moves toward the closed position, protecting the valve stem/piston yet causing all other unobstructed valve stems to move to the closed position. In contrast, in the embodiments described above, if an obstruction 311 exists at the gate preventing the valve stem from moving to the closed position as the actuator plate moves to the closed position, the retainer plate would continue to push on the piston/valve stem, possibly causing the valve stem to become damaged.

Figure 5A:
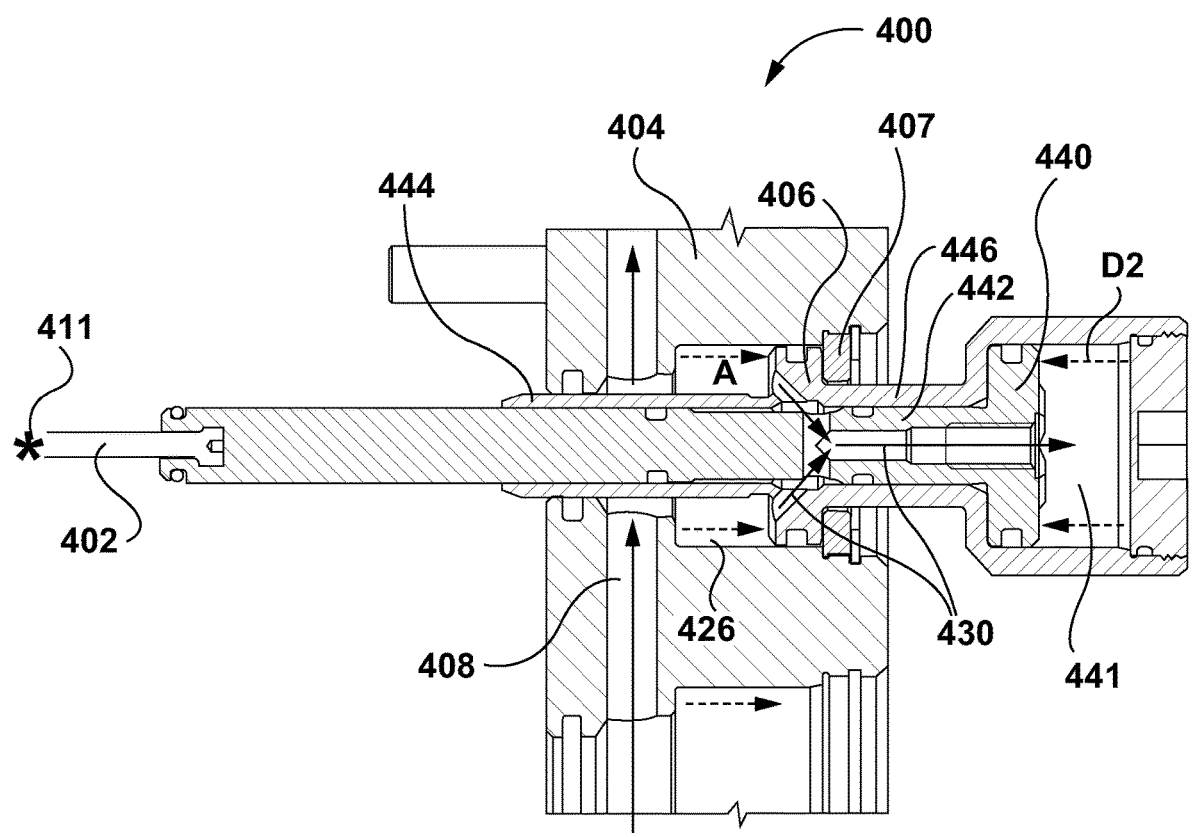
FIGS. 5A-5C are cross-sectional schematic representations of a portion of a valve stem actuation system according to another embodiment.

In another embodiment, the system provides for the plate actuation to remain operative in the event the valve stem becomes stuck and/or encounters an obstruction. As shown in FIG. 5A, for example, the hot runner 400 may include a first piston 406 for valve stem actuation, as described above, that allows for continued plate actuation even when a valve stem become stuck at the gate. The hot runner also may include a second piston 440 for valve stem protection, allowing for continued plate actuation even when the valve stem encounters an obstruction. In these embodiments, the first piston 406 may include an air piston 406 for holding the valve stem 402 against the retainer 407 via pressurized air A acting on the piston 406 as the actuation plate 404 reciprocates back and forth to drive the valve stem 402. This first piston arrangement operates in a manner described above with respect to FIGS. 1-3. The second piston 440 may be arranged similar to that of FIG. 4.

As shown in FIG. 5, the second piston 440 may be coupled to the air piston 406 and may extend through the retainer plate 404. More specifically, the second piston 440 may include a shaft portion 442 that extends through the first air piston and is directly coupled to the valve stem 402. The first piston 406 also includes a shaft portion 444 surrounding the shaft 442 of the second piston 440 and extending through the actuation plate 404. The first piston 406 also includes a housing 446 formed on the piston and extending in a direction opposite the valve stem. This housing acts as the cylinder bore (e.g., see chamber 441) for the second piston 440. This second piston acts as a protection system to prevent damage to the valve stem if an obstruction 411 is preventing the valve stem from moving toward the closed position Similar to FIG. 4, the air piston 406 and the protecting piston 440 of FIG. 5A include air passageways 430 through which pressurized air passes from the air channels 408 into a chamber 441. In embodiments in which the hot runner operates normally, pressurized air A acts on the first piston, holding the first piston 406 against the retainer 407, and pressurized air D2 acts on the second piston 440, biasing the second piston 440 towards the closed position. In this manner, as the actuation plate moves the valve stem 402 to the closed position, the retainer pushes on the first piston 406 and the air pressure D2 acts on the second piston 440.

Figure 5B:
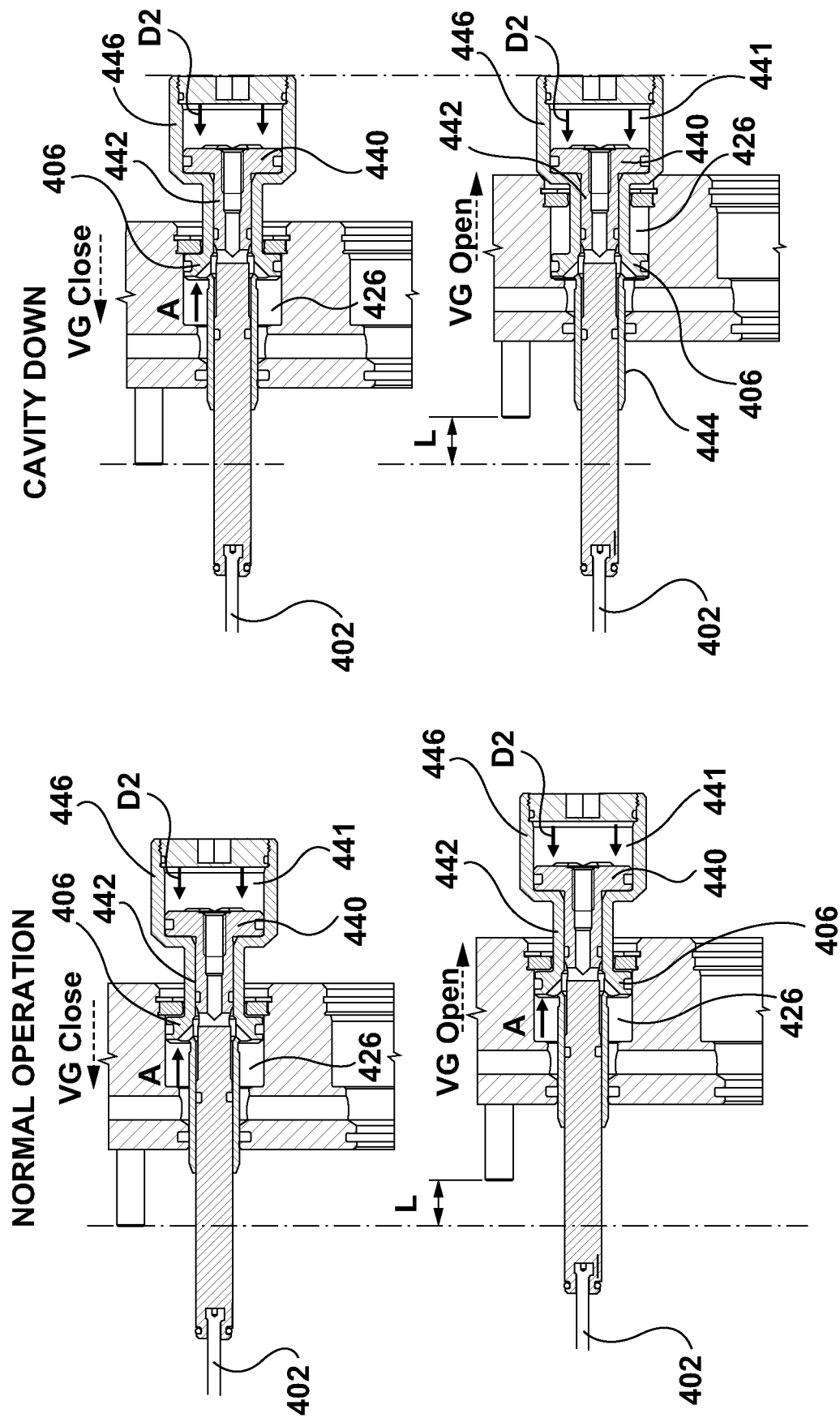

In situations where the valve stem becomes stuck in the closed position (e.g., the stuck piston 406 separates from the retainer 407), the air acting on the air piston 406 (e.g., the air in the piston bore 426) is allowed to simply compress, as shown in FIG. 5B, as the actuation plate 406 moves to the open position. Specifically, the actuation plate 404 moves to the open position while the first piston 406, housing and valve stem 402 remains stationary.

Figure 5C:
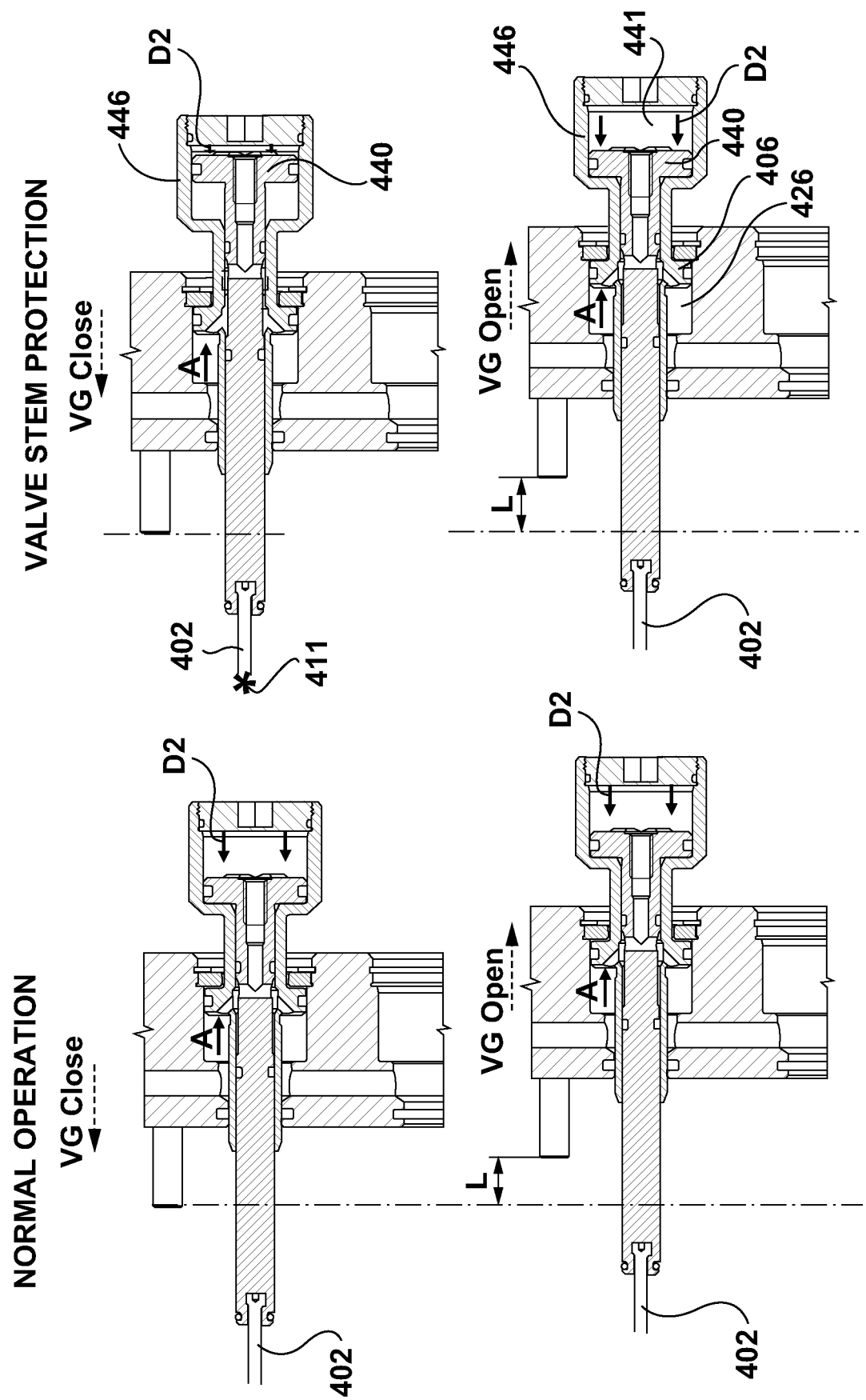

If, instead, the valve stem 402 encounters an obstruction 411 in the mold cavity during closure, the actuation plate will still continue to push on the retainer 407, which in turn pushes the piston 406 and valve stem 402. As shown in FIG. 5C, to protect the valve stem in such a situation, the first piston 406 is configured to pull on the housing when the actuation plate moves towards the closed position, which will compress the air acting on the second piston (e.g., the air in the chamber 441). As will be appreciated, this allows the valve stem to remain stationary with respect to the actuation plate 404 in the event of an obstruction and their pressure that tends to push the valve stem toward the obstruction simply compresses and the valve stem remains stationary.

Although the hot runner has been shown and described as using pressurized air to protect the valve stem in the event that the valve stem becomes stuck and/or encounters an obstruction, it will be appreciated that other arrangements may be used to protect the valve stem. For example, as shown in FIGS. 6A-6B and FIG. 7, the hot runner 500 may include a spring 550 to provide valve stem 502 protection.

For example, in some embodiments, the spring 550 may be used to protect the valve stem during the purging process of a multi-material hot runner when an unmelt of molding material blocks the gate. Without wishing to be bound by theory, when shutting down a multi-material hot runner, it is common to at least partially purge a secondary (e.g., barrier) molding material in barrier channels of the nozzles using a reverse flow of primary (e.g., skin) molding material (e.g., from the inner and/or outer flow channels of the nozzle). To purge the secondary molding material in such a situation, the valve stems are retracted into a back position, a short shot (e.g., a partial shot) of the primary molding material is injected through the nozzle into the molding cavity, and the melt is allowed to solidify. As will be appreciated, the solidified melt forms a short (e.g., partially) molded article that plugs the gate. When the flow of the primary molding material is again resumed (e.g., at a lower pressure), the plug redirects the flow into the secondary (e.g., barrier) channels of the nozzle to complete the purge. To restore operation of the hot runner, the solidified plugs must be removed from the respective gates. This may be performed via a mold opening and ejection sequence, whereby the plugs are stripped along with the short (e.g., partially) molded articles. Unfortunately, one or more plugs, or at least part of the one or more plugs, may remain in the gates. In such a situation, when the valve stems are closed, the valve stems may be subjected to an abnormal (e.g., high) closing force that may shear the safety pins that couples the valve stems to the air pistons.

In other embodiments, not shown, the spring 550 may be used to protect the valve stem in other applications such as, for example, a monolayer PET systems (i.e. the molding of preforms of the type for blow molding into containers that are molded entirely of PET material without layers). Often on a monolayer PET systems, difficulties may be arise during startup where the cycle is interrupted with valve gate in the open position, whereby melt drool is able to solidify to produce a localized 'gate nub' (i.e. partial molding in the region of the gate channel). Normally the technician manually removes these gate nubs to allow plastic to fill the cavity as the solidified nubs cannot be ejected or re-melted by the next shot. However scenarios do arise wherein the technician misses removing all or part of one or more gate nubs that thereafter may provide an obstruction to the subsequent closing of the gate channel.

Figure 6A:
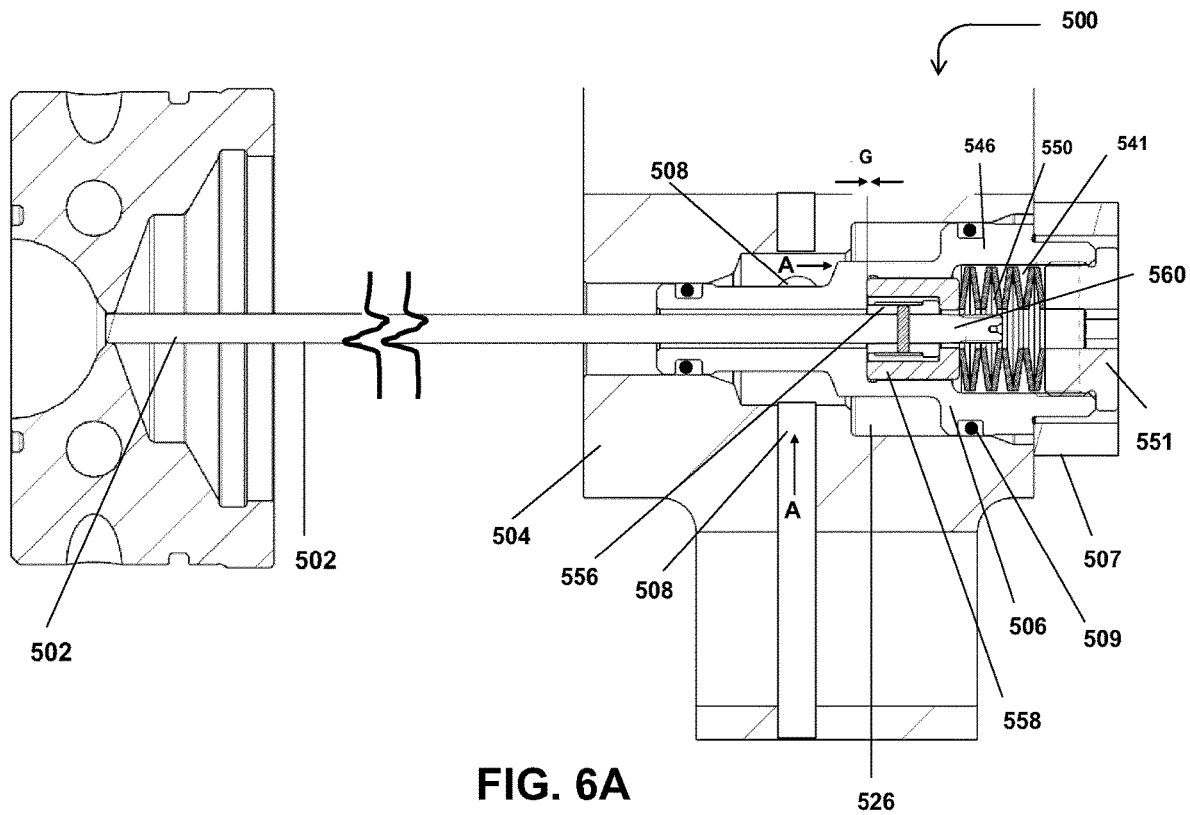
FIGS. 6A and 6B are cross-sectional schematic representations of a portion of a valve stem actuation system according to another embodiment.
Figure 6B:
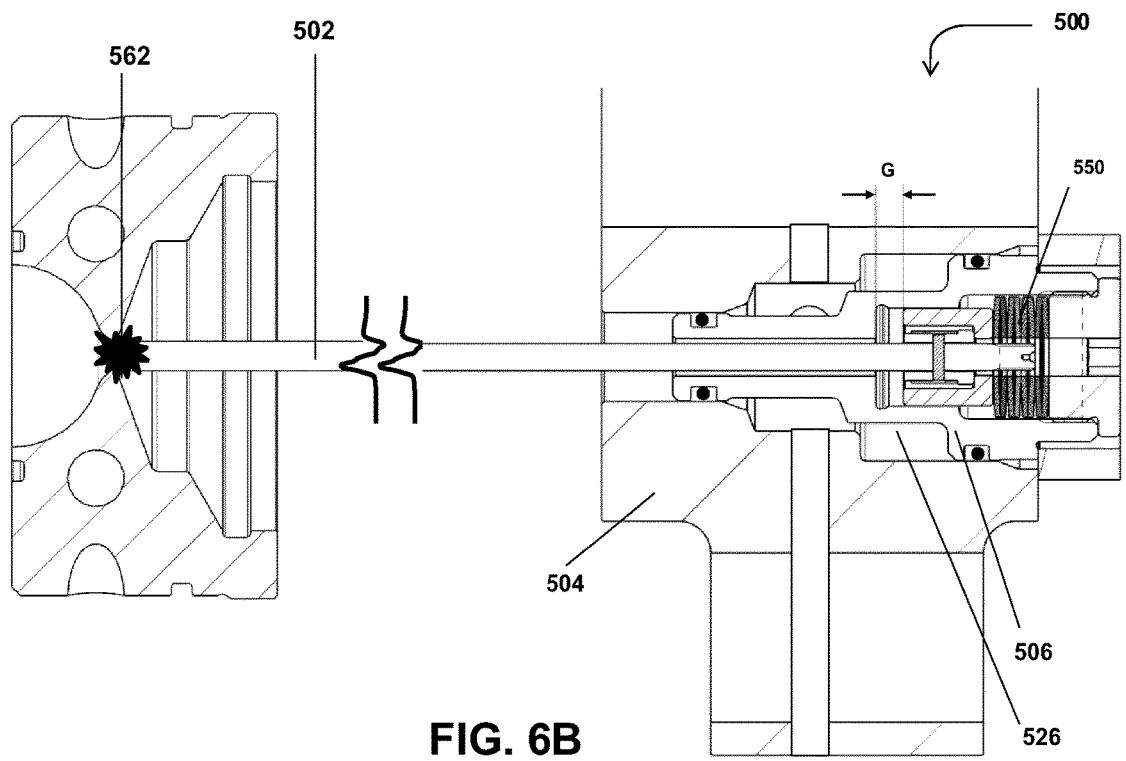
Figure 7:
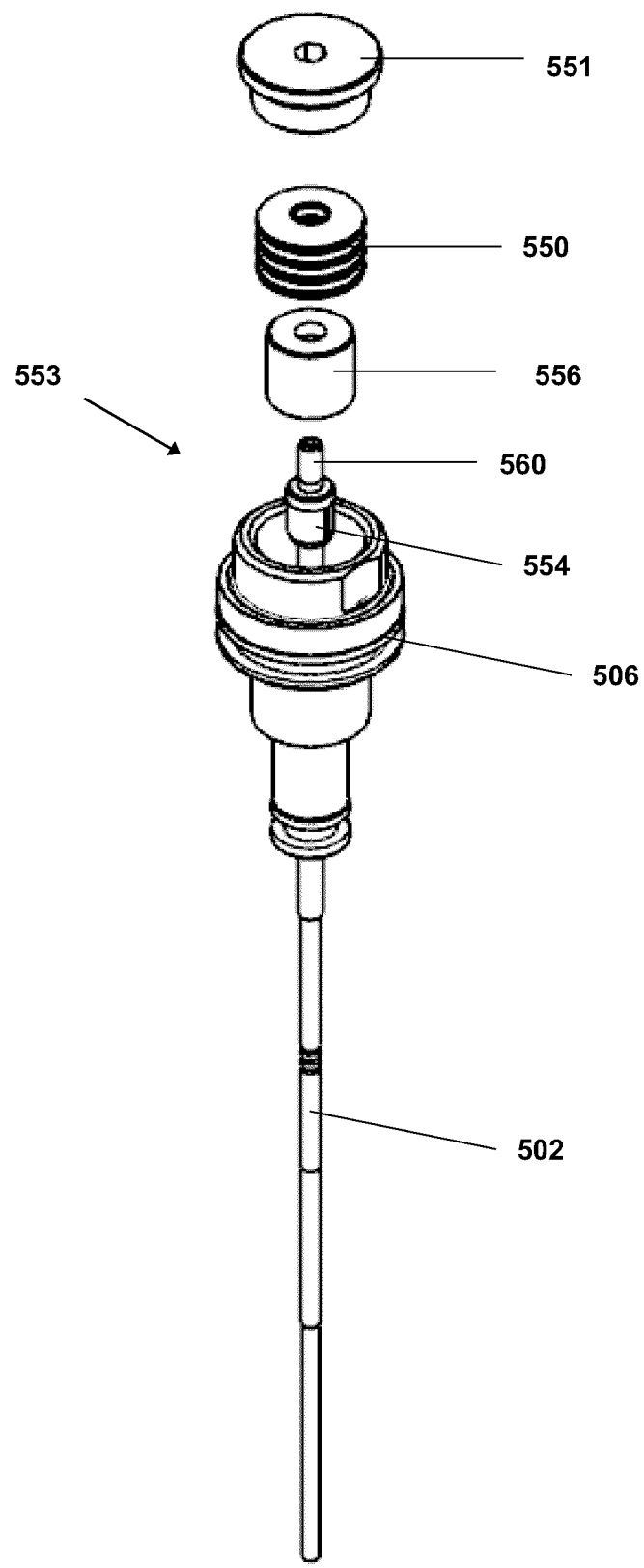
FIG. 7 is an exploded perspective view of a portion of the valve stem actuation system according to another embodiment.

As shown in FIG. 6A, the valve stem 502 is coupled to the air piston 506, which, in turn, is held in contact with the retainer plate 507 via pressurized air A travelling through the air channels 508. As with other embodiments, the air piston 506 is received in and moves relative to the air piston bore 526 formed in the actuation plate 504. A seal 509 may be used to maintain the air pressure A in piston bore 526.

In some embodiments, the air piston 506 includes a housing 546 that includes a bore (see, e.g., cylinder 541) in which the spring 550 is housed.

In some embodiments, the spring 550 is coupled to the proximal end of the valve stem 502 via a valve stem assembly 553 (see also the exploded perspective view of FIG. 7). In such embodiments, the valve stem assembly 553 may include a valve stem head 554 that is received in a sleeve 556 of a valve stem retainer 558. The valve stem assembly also includes a shear pin 560 that connects the valve stem head 554 to the spring 552. As will be appreciated, the shear pin 560 may be removably attached to the valve stem head 554 in some embodiment, although it also may be permanently attached. As with the spring 550, the valve stem assembly also may be housed in the cylinder 541 of the air piston 506. As shown in FIG. 6A, a spring cap 551 is screwed into the housing to close the cylinder, holding the spring 550 therein.

As shown in FIG. 6A, in a normal operating position, the spring 552 is held in between the valve stem retainer and the spring cap 552, and travels back and forth during plate actuation. As will be appreciated, in such a normal operating position, the spring may be preloaded to a specific force to ensure that pressure cannot force the valve stem backwards and create a tall gate. In some embodiments, the spring 552 biases the valve stem towards the piston. In some embodiments, a gap G is maintained between the valve stem retainer 558 and the air piton 506, which allows the valve stem 502 to float within the air piston 506. In some embodiments, the gap is between about 0.01 and 0.5 mm.

FIG. 6B illustrates an embodiment in which the valve stem 502 encounters an obstruction 562 that stops valve stem 502 movement. As shown in this figure, the actuation plate 504 has continued to move towards the gate, which, in turn, pushes the piston 506 and valve stem 502. To protect the valve stem in such a situation, the spring 550 may be compressed as the actuation plate 504 moves towards the closed position. Without wishing to be bound by theory, compressing the spring may limit the force exerted on the valve stem via the obstruction.

In some embodiments, compressing the spring allows the valve stem to remain stationary with respect to the actuation plate 404. For example, as shown in FIG. 6B, the gap G increases as the spring compresses. In some embodiments, as is shown, the air pressure A is still sufficient to keep the piston 506 pressed against the retainer plate 507.

In some embodiments, the hot runner may be configured to maintain and/or to extend the life of the seals used. For example, to ensure that the seals are reliable when they become dynamic, the actuation plate may be cycled prior to starting up in a maintenance mode, with all nozzles tip heaters off. All valve stems and pistons may then be locked in the closed positions by the solidified drops. The machine may then turn off the air supply to the actuation plate and vent to the atmosphere. The actuation plate may then cycle back and forth to work the seals in the air piston. After this maintenance, the machine may resume normal system operation.

In some embodiments, the hot runner may be configured to shut down if the machine senses a drop in pressure. For example, if a loss of pressure is detected (e.g., the pressurized air supply S is decreased), the machine may sound an alarm and stop the molding cycle. As will be appreciated, the molding machine may be stopped to ensure that the machine does not inject with all or some of the valve stems in the closed position or if they lag behind, or if the gates are not fully open. In some embodiments, this pressure monitoring may mitigate the risk of injecting on closed valve stems and over pressurizing (e.g., an internal leak) the hot runner.

Although embodiments have been shown and described with a valve stem being held against the actuation plate via air pistons, (that is, the air pistons are held against the actuation plate via air pressure), in other embodiments, the head of the valve stem itself may be pressed against the retainer plate. That is, a valve pin head 303 of the valve pin may be held against the actuation plate via air pressure and disposed within a bore via suitable seals.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A hot runner of an injection molding machine for passing melt into a mold cavity, the hot runner comprising:
    a first valve gated nozzle having a first gate configured to pass melt into the mold cavity and a first valve stem movable relative to the first gate between an open position to allow passage of melt into the mold cavity and a closed position to prevent passage of melt into the mold cavity;
    a first piston coupled to the first valve stem; and
    an actuation plate being movable in a first direction toward the first gate and a second direction away from the first gate, the actuation plate acting on the first piston and configured to move the first valve stem between the open position and the closed position;
    wherein the first piston is movable relative to the actuation plate, the first piston to be continuously biased in the second direction and held against at least a portion of the actuation plate via pressurized air to move with movement of the actuation plate in the first and second directions;
    wherein the actuation plate is configured to simultaneously actuate a plurality of valve stems, the first valve stem being one of the plurality of valve stems.

2. The hot runner of claim 1, wherein the actuation plate comprises a plurality of piston bores including a first piston bore arranged to receive the first piston.

3. The hot runner of claim 2, wherein the actuation plate includes a retainer plate and when the first piston is disposed in the piston bore and held against the portion of the actuation plate, the first piston is pressed against the retainer plate.

4. The hot runner of claim 1, wherein the actuation plate further comprises one or more air channels for delivering pressurized air to the first piston.

5. The hot runner of claim 1, wherein, when the first valve stem is stuck in the closed position, the first piston is held in a stationary position relative to the first gate as the actuation plate moves in the second direction.

6. The hot runner of claim 5, wherein, when the first piston is held in the stationary position as the actuation plate moves in the second direction, the pressurized air acting on the first piston becomes compressed.

7. The hot runner of claim 1, further comprising a second valve gated nozzle having a second gate configured to pass melt into the mold cavity, a second valve stem and a second piston coupled to the second valve stem; wherein the second piston is movable relative to the actuation plate, the second piston being continuously biased in the second direction and held against the portion of the actuation plate via pressurized air to move with movement of the actuation plate in the first and second directions.

8. The hot runner of claim 7, wherein, when the first valve stem is stuck in the closed position, the first piston remains in a stationary position relative to the first gate as the actuation plate moves in the second direction; and wherein the second piston is held via pressurized air against the portion of the actuation plate and moves with the actuation plate in the second direction to move the second valve stem toward the open position.

9. The hot runner of claim 8, wherein the actuation plate includes a retainer plate and, when the first valve stem is stuck in the closed position and the first piston remains in the stationary position as the actuation plate moves in the second direction, the second piston is pressed against the retainer plate.

10. The hot runner of claim 1, further comprising a spring biasing the valve stem towards the first piston.

11. The hot runner of claim 10, wherein:
    the first piston comprises a chamber;
    the spring is disposed in the chamber; and
    when the valve stem is stuck in the closed position, the spring is compressed as the actuation plate moves in the first direction towards the first gate.

* * * * *